April 11, 1950     W. A. WILLIAMS     2,503,860
FASTENING MEANS
Filed March 14, 1945
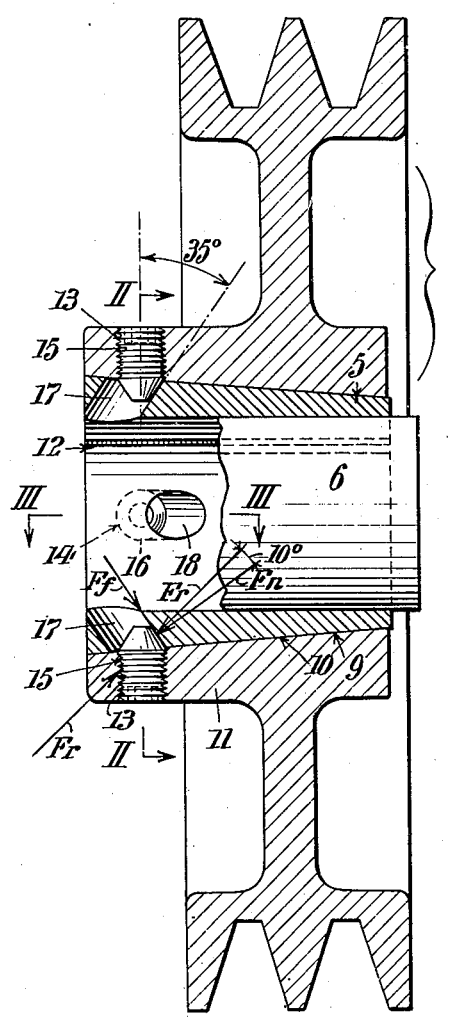
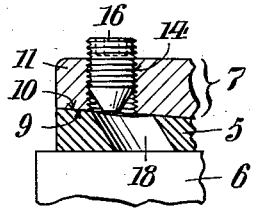
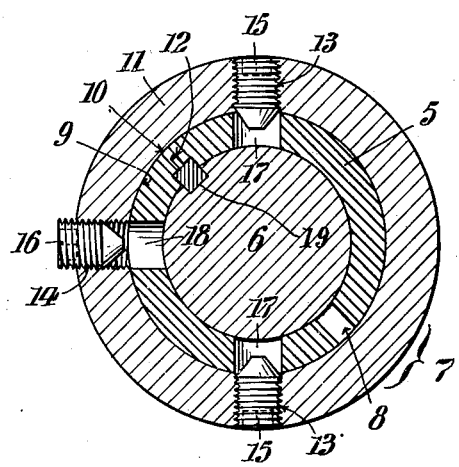
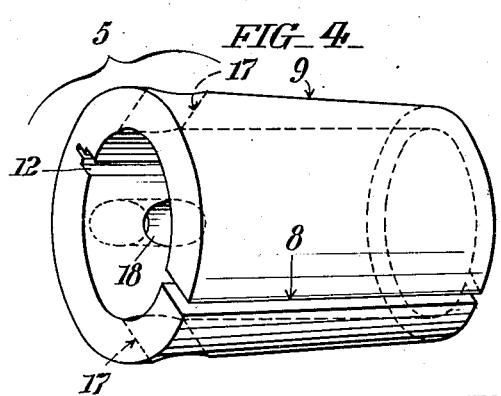
WITNESSES
Hubert Fuchs
Thomas W. Kerr, Jr.
INVENTOR:
William A. Williams,
BY Paul & Paul
ATTORNEYS.

Patented Apr. 11, 1950

2,503,860

UNITED STATES PATENT OFFICE 2,503,860

FASTENING MEANS

William A. Williams, Philadelphia, Pa., assignor to The American Pulley Company, Philadelphia, Pa., a corporation of Pennsylvania Application March 14, 1945, Serial No. 582,676

2 Claims. (Cl. 287—53)

This invention relates to securing devices useful more particularly in securing wheels, levers, cranks, etc. to shafts or rods.

My invention has for its main purpose to provide a simple and inexpensive fastening means which can be relied upon to effectively secure a wheel or the like to its shaft, and which is so constructed as to permit quick and easy application or removal of a wheel or similar element without requiring the use of any special tool or tools in these operations.

One way in which the foregoing and other objectives are readily realized in practice will appear from the following detailed description of the attached drawings, wherein Fig. 1 is a view, partly in elevation and partly in section, showing a wheel secured to a shaft by fastening means conveniently embodying my invention.

Fig. 2 is a cross section taken as indicated by the angled arrows II—II in Fig. 1.

Fig. 3 is a fragmentary detail sectional view taken as indicated by the angled arrows III—III in Fig. 1; and Fig. 4 is a perspective view of one of the component elements of the fastening means.

From these illustrations it will be observed that my improved fastening means includes a sleeve 5 to fit over the shaft 6 (Fig. 1) to which a wheel or the like 7 is to be secured, said sleeve being longitudinally split as at 8, and tapered as at 9 to engage a correspondingly tapered bore 10 in the hub 11 of said wheel. For the purpose of rendering it more readily contractible and expansible, the sleeve 5 has its cross section reduced opposite the split 8 by slotting and saw cutting as shown at 12. Threadedly engaged in tapped radial holes 13 and 14 in the wheel hub 11 at circumferentially spaced intervals are taper-ended set screws 15 and 16 preferably of the "Allen" or socketed type. As shown, the screws 15 are arranged to cooperate with cam surfaces afforded by smooth holes 17 which extend through the sleeve 5 at an inclination in the direction of the length of the sleeve, and the screw 16 with a cam surface provided by a hole 18 which extends through said sleeve at an opposite inclination in the direction of the length of the sleeve.

By reason of this construction, it will be apparent that drawing up of the screws 15 will be attended by shifting of the sleeve 5 to the right in Fig. 1 relative to the shaft 6 and the wheel 7, thereby causing the sleeve to be wedged between the surfaces of the shaft and the wheel bore and the assemblage to be effectively clamped in position on the shaft. Release of the assemblage for removal is accomplished on the other hand by first backing off the screws 15 and thereafter drawing up the screw 16, with attendant axial shifting of the sleeve 5 toward the left relative to the shaft 6 and the wheel 7.

In practice, I preferably form the sleeve with an eight degree taper, drill the holes 17 and 18 at an angle of thirty-five degrees to the axes of the screws 15 and 16, and taper the ends of said screws to the same angle so that the sloped surfaces of the latter will bear flat against the surfaces of said holes at one side. With the parts so designed, there is no tendency of the set screws 15 and 16 to twist or cock during tightening or release of the wheel as might be expected or assumed from a casual observation of Fig. 1 of the drawings, since in shifting the sleeve in one direction or the other, the load is taken by the screws 15 or 16 at one side only. For this reason, the resultant of the forces involved produce a longitudinally directed force on the bushing exactly equal to the downward or inward force of any one of the set screws; the mechanical effect being thus in the ratio of one to one after compensation for friction. The screws 15 are therefore capable of acting upon the sleeve 5 to cause effective binding of the wheel to the shaft.

The operation of my improved fastening means will probably be best understood by reference again to Fig. 1, wherein the arrow $Fn$ represents the normal force which acts perpendicular to the sliding surface; $Ff$ the frictional force due to the sliding action between the set screws 15 and bushing; and $Fr$ the resultant of the friction force of $Fn$. Thus the resultant is so directed as to fall within the threaded length of the set screw at the outer side of the latter where it meets with the hub of the wheel. If the resultant headed downward to a point beyond the hub of the pulley, there would be a cocking action, but since it will always fall within the length of the set screw as just pointed out, all the forces are self-contained to the end that no cocking action can take place.

Two tightening screws 15 disposed at diametrically opposite points and one releasing screw 16 disposed at an intermediate point as herein shown by way of example, ordinarily suffice for small pulleys; but for larger pulleys, the number of tightening screws may be increased as may be required. In any case but one releasing screw is ordinarily needed.

For greater insurance against the possibility of slippage, I may employ a key 19 (Fig. 2) on the shaft 6 to engage into the large portion of the groove 12 in the sleeve 5, said key being made somewhat narrower than the groove so that it cannot interfere with compression of said sleeve incident to securing the wheel. The use of a key is however not ordinarily necessary for small wheels.

Having thus described my invention, I claim:

1. A fastening means for securing a wheel or the like to a shaft, including a tapered wedge sleeve in interposition between the shaft and the shaft bore in the hub of the wheel, said sleeve having two circumferentially spaced holes adjacent one end thereof, one hole sloped in one direction toward the shaft axis and the other hole sloped in the other direction to provide oppositely inclined cam surfaces; a screw engaged in the wheel hub to cooperate with the cam surface of one of the holes in the sleeve to shift the latter into binding relation with the shaft and the wheel bore; and a second screw likewise engaged in the wheel hub to cooperate with the cam surface of the other of the aforesaid holes to reversely shift the sleeve in preparation for the removal of the wheel.

2. Fastening means according to claim 2, wherein the screws pass radially through the wheel hub and have coned ends to cooperate with the cam surfaces of the respective holes in the sleeve.

WILLIAM A. WILLIAMS.

REFERENCES CITED

The following references are of record in the file of this patent:

UNITED STATES PATENTS

| Number | Name | Date |
|---|---|---|
| 1,661,226 | Martin | Mar. 6, 1928 |
| 1,973,809 | Heggem | Sept. 18, 1934 |
| 2,098,709 | Murden et al. | Nov. 9, 1937 |
| 2,400,254 | Penick | May 14, 1946 |